United States Patent [19]
Baker et al.

[11] Patent Number: 5,549,248
[45] Date of Patent: Aug. 27, 1996

[54] COMBINATION LAWN FEEDER AND SPRINKLER DEVICE

[76] Inventors: John S. Baker; Joyce V. Baker, both of 717 W. Warren Ave., Tampa, Fla. 33602

[21] Appl. No.: 369,083

[22] Filed: Jan. 5, 1995

[51] Int. Cl.$^6$ .................................. B05B 3/06; B05B 7/28
[52] U.S. Cl. .......................... 239/251; 239/310; 239/273
[58] Field of Search .................................. 239/251, 230, 239/233, 262, 261, 10, 310, 273

[56] References Cited

U.S. PATENT DOCUMENTS

| | | | |
|---|---|---|---|
| 2,580,629 | 1/1952 | Wenzel | 239/251 X |
| 2,622,928 | 12/1952 | Misch | 239/251 X |
| 2,723,159 | 11/1955 | Nelson | 239/262 X |
| 2,787,499 | 4/1957 | Rolston | 239/262 X |
| 2,873,083 | 2/1959 | Rimsha | 239/262 X |
| 2,981,284 | 4/1961 | Putnam | 239/581.1 |
| 4,193,542 | 3/1980 | Gladstone | 239/251 |

*Primary Examiner*—Kevin P. Weldon

[57] ABSTRACT

A combination lawn feeder and sprinkler device includes a fluid container formed in a generally cylindrical configuration. The fluid container functions to hold water soluble fertilizer. The fluid container includes a cover with an aperture extending therethrough which is releasably coupled to the container. The apparatus also includes a propeller having a central shaft and a plurality of blades extending therefrom. The propeller functions to evenly distribute the water and fertilizer on a lawn. The shaft and blades have hollow interiors. The shaft is coupled within the aperture in the cover. The central shaft permits the flow of fluid from the container to the blades in the operative orientation. The free ends of each blade having an aperture to permit the dispersion of fluid through it. The shaft also includes a radially positioned hole. An associated water control device is also a feature of the apparatus. The water control device has two free ends. A first free end is positioned in the hole in the shaft. A second free end is adapted to be coupled to a garden hose. The water control device permits the user to regulate the flow of water therethrough in the operative orientation.

1 Claim, 4 Drawing Sheets

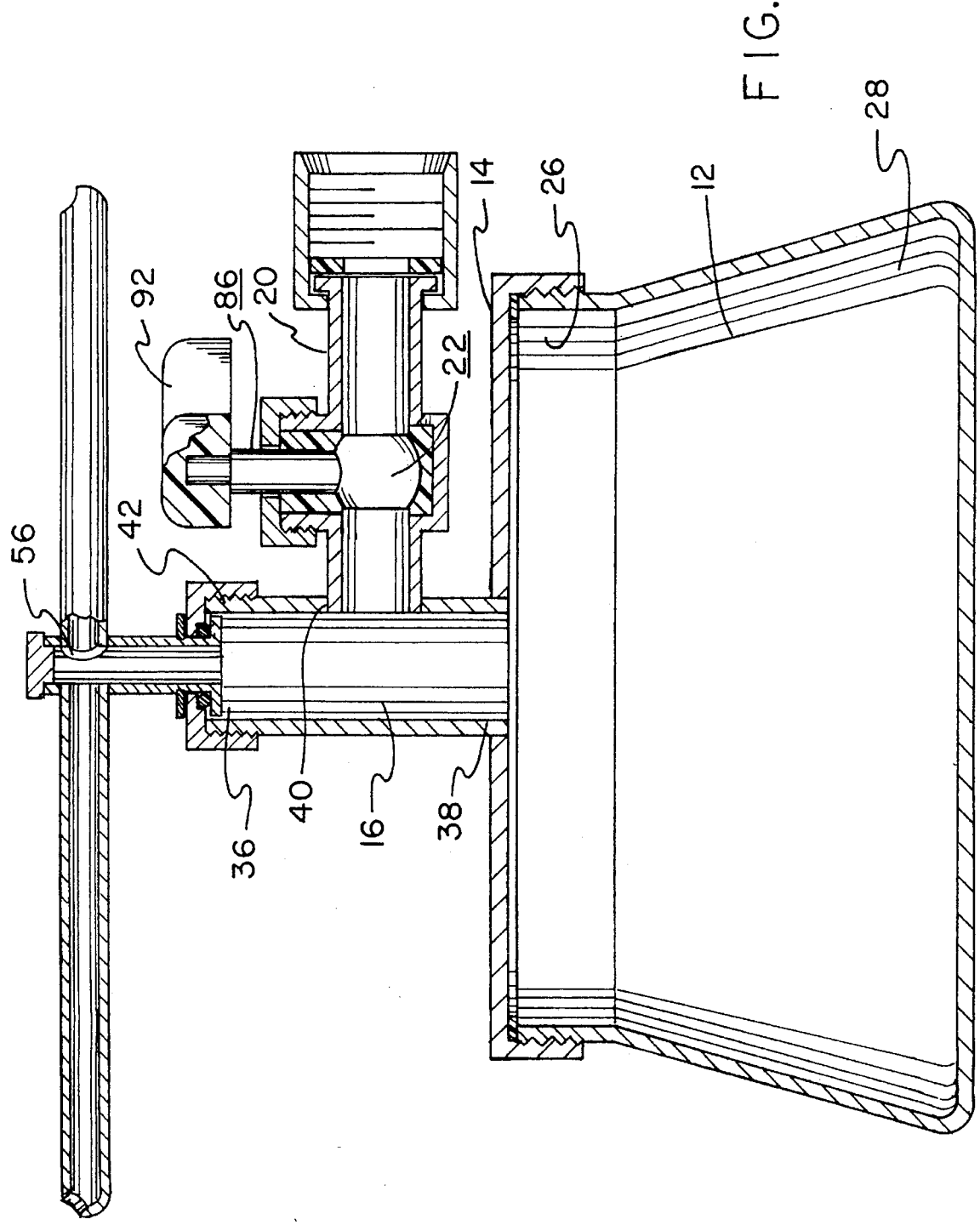

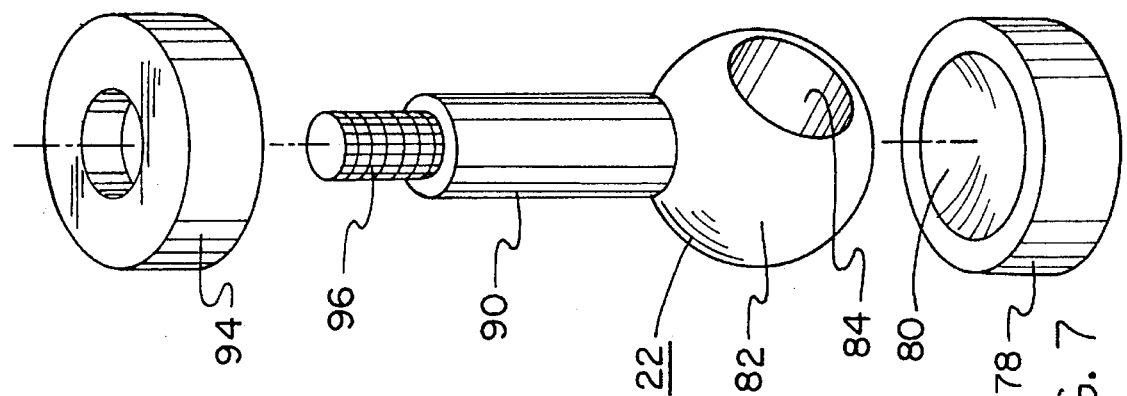
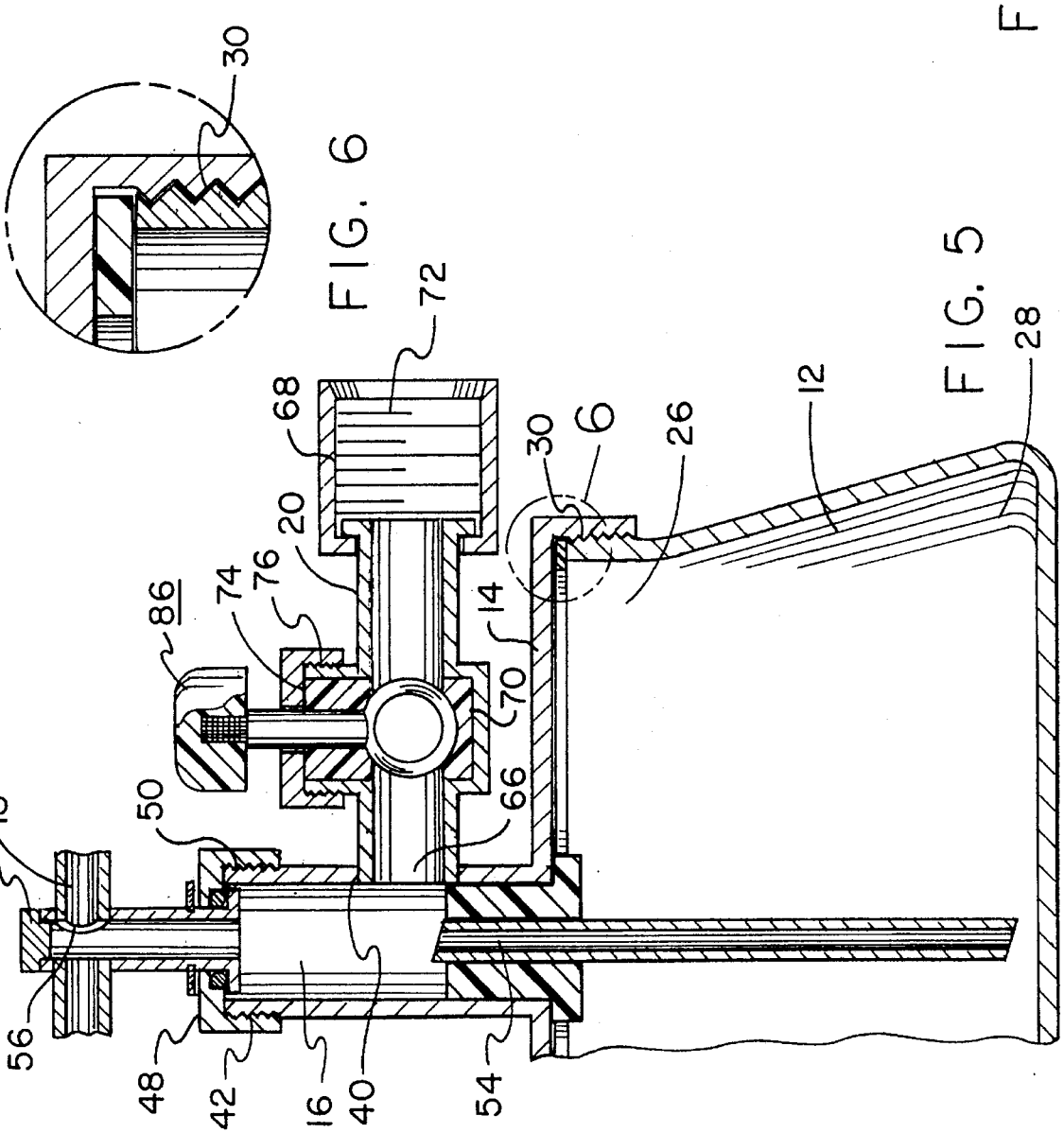

COMBINATION LAWN FEEDER AND SPRINKLER DEVICE

BACKGROUND OF THE INVENTION

1. Field of the Invention

The present invention relates to a combination lawn feeder and sprinkler device and more particularly pertains to dispensing a controlled flow of water and water soluble fertilizer through circularly rotating sprinkler blades.

2. Description of the Prior Art

The use of lawn sprinkling and dispensing devices is known in the prior art. More specifically, lawn sprinkling and dispensing devices heretofore devised and utilized for the purpose of distributing water and chemicals upon a recipient lawn are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. Des. 327,728 to Baker a lawn sprinkler for spraying water, chemicals, or the like.

U.S. Pat. No. 4,033,509 to Sheets discloses a lawn sprinkler and fertilizer dispenser.

U.S. Pat. No. 5,096,123 to Petitgoue discloses a lawn sprinkler and dispensing apparatus.

U.S. Pat. No. 5,150,840 to Grynkiewicz discloses a lawn chemical dispenser.

Lastly, U.S. Pat. No. 3,845,902 to Delamater discloses a sprinkler feeder for lawn food.

In this respect, the combination lawn feeder and sprinkler device according to the present invention substantially departs from the conventional concepts and designs of the prior art, and in doing so provides an apparatus primarily developed for the purpose of dispensing a controlled flow of water and water soluble fertilizer through circularly rotating blades.

Therefore, it can be appreciated that there exists a continuing need for a new and improved combination lawn feeder and sprinkler device which can be used for dispensing a controlled flow of water and water soluble fertilizer through circularly rotating sprinkler blades. In this regard, the present invention substantially fulfills this need.

SUMMARY OF THE INVENTION

In view of the foregoing disadvantages inherent in the known types of lawn sprinkling and dispensing devices now present in the prior art, the present invention provides an improved combination lawn feeder and sprinkler device. As such, the general purpose of the present invention, which will be described subsequently in greater detail, is to provide a new and improved a combination lawn feeder and sprinkler device and method which has all the advantages of the prior art and none of the disadvantages.

To attain this, the present invention essentially comprises a new and improved combination lawn feeder and sprinkler device comprising, in combination, a fluid container formed in a cylindrical configuration with an open top, the upper extent of the container having a smaller diameter then the lower extent with a gradually increasing diameter therebetween, the upper extent including coupling means; a cover formed in a planar circular configuration with an upper surface and a lower surface, the cover including a downwardly extending ledge with coupling means, the cover being coupled to the upper extent of the container, the center point of the cover having a circular aperture extending therethrough; an extension rod formed in a hollow cylindrical configuration with two open ends, the approximate center point of the rod having a radially positioned circular aperture, the uppermost end of the extension rod including coupling means, the lower extent of the extension rod being positioned in the aperture in the cover; a propeller having a central shaft and three horizontally extending blades, the shaft being formed in a hollow cylindrical configuration with a closed upper extent and an open lower extent, the shaft including a cylindrical collar with coupling means, the collar being coupled to the upper extent of the extension rod, a tube formed in a hollow cylindrical configuration, the tube extending from the upper extent of the shaft through the extension rod and into the container, the upper extent of the shaft having three radially positioned apertures, three blades formed in a hollow cylindrical configuration with an inboard end and an outboard end, each inboard end being positioned within the apertures of the shaft, each outboard end including an aperture to permit the expulsion of fluid; a water control device having a hollow interior with an inboard region, an outboard region and a central region therebetween, the inboard region being positioned within the hole in the extension rod, the outboard region having a larger diameter than the inboard region and including coupling means; and the central region being formed as an enlarged chamber, a valve system being positioned therein, the lower extent of the valve system being formed as a planar circular base, the lower extent including a concave depression, a bearing formed in a generally spherical configuration being positioned in the depression of the lower extent, the bearing having a horizontally positioned radial aperture extending therethrough, the bearing permitting circular rotation upon its vertical axis to alter the flow of water therethrough, the valve system including a generally L-shaped handle with a horizontal upper portion and a vertical lower portion, the lower extent of the vertical portion being affixed to the uppermost extent of the bearing, the horizontal portion being formed in a planar circular configuration with a projection extending therefrom, the horizontal portion being releasably coupled to the vertical portion, a collar with coupling means being positioned around the vertical portion of the handle and coupled to the upper extent of the chamber, the valve system permitting the user to control the flow of water through the apparatus in the operative orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved combination lawn feeder and sprinkler device which has all of the advantages of the prior art lawn sprinkling and dispensing devices and none of the disadvantages.

It is another object of the present invention to provide a new and improved combination lawn feeder and sprinkler device which may be easily and efficiently manufactured and marketed.

It is a further object of the present invention to provide a new and improved combination lawn feeder and sprinkler device which is of durable and reliable constructions.

An even further object of the present invention is to provide a new and improved combination lawn feeder and sprinkler device which is susceptible of a low cost of manufacture with regard to both materials and labor, and which accordingly is then susceptible of low prices of sale to the consuming public, thereby making such a combination lawn feeder and sprinkler device economically available to the buying public.

Still yet another object of the present invention is to provide a new and improved combination lawn feeder and sprinkler device which provides in the apparatuses and methods of the prior art some of the advantages thereof, while simultaneously overcoming some of the disadvantages normally associated therewith.

Still another object of the present invention is to dispense a controlled flow of water and water soluble fertilizer through circularly rotating sprinkler blades.

Lastly, it is an object of the present invention to provide a new and improved combination lawn feeder and sprinkler device comprising a fluid container formed in a generally cylindrical configuration, a cover with an aperture extending therethrough being releasably coupled to the container; a propeller having a central shaft and a plurality of blades extending therefrom, the shaft and blades having hollow interiors, the shaft being coupled within the aperture in the cover, the central shaft permitting the flow of fluid from the container to the blades in the operative orientation, the free ends of each blade having an aperture to permit the dispersion of fluid therethrough, the shaft including a radially positioned hole; and a water control device having two free ends, a first free end being positioned in the hole in the shaft, a second free end adapted to be coupled to a garden hose, the water control device permitting the user to regulate the flow of water therethrough in the operative orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a cross-sectional view taken along line 4—4 of FIG. 3 and illustrating the valve in the open position.

FIG. 5 is a partially broken away cross-sectional view of the apparatus illustrating the valve in the closed position.

FIG. 6 is an exploded cross-sectional view of the apparatus taken along line 6—6 of FIG. 5.

FIG. 7 is an exploded separated view of the valve system of the apparatus.

The same reference numerals refer to the same parts through the various Figures.

DESCRIPTION OF THE PREFERRED EMBODIMENT

Figure 1:
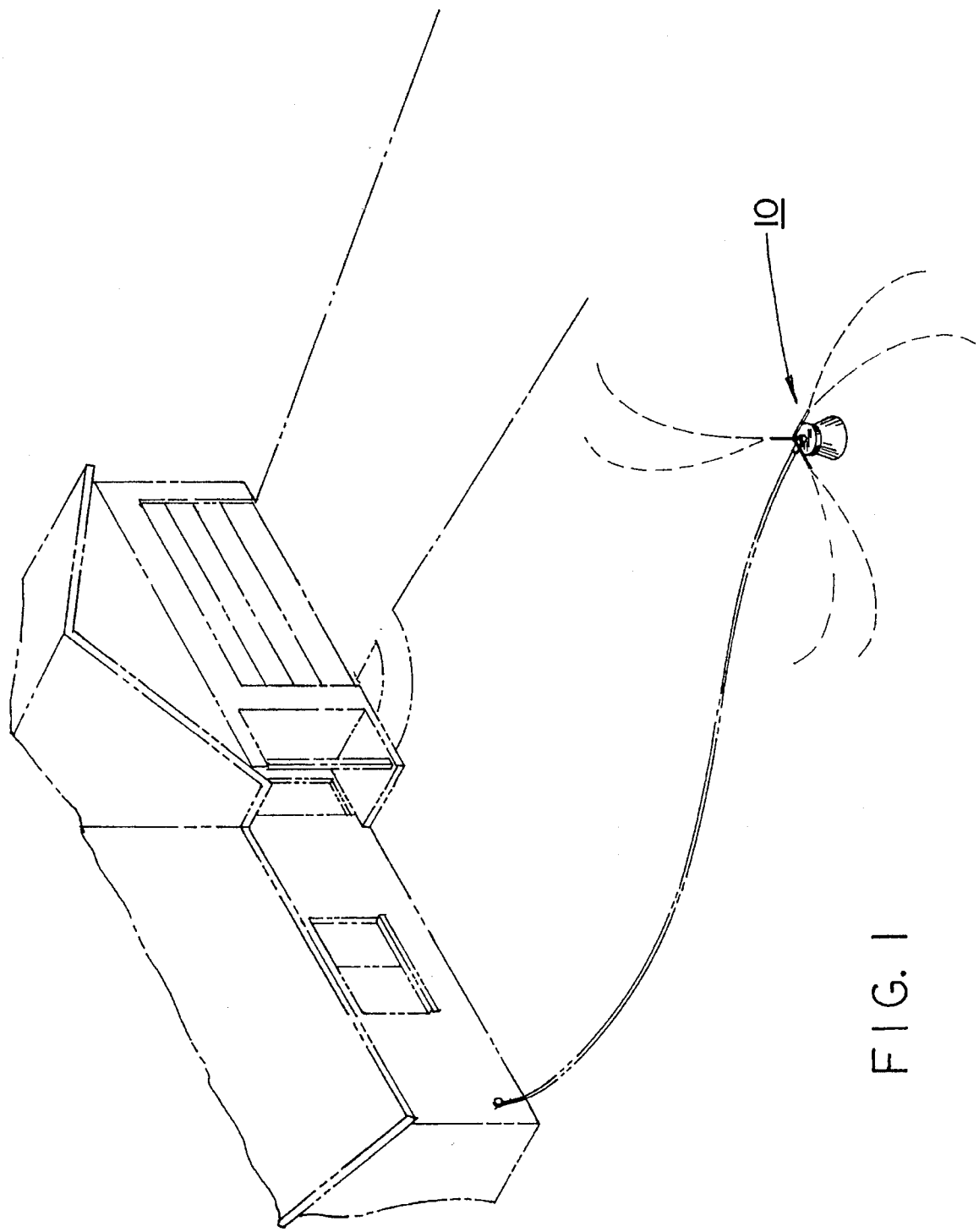
FIG. 1 is a perspective view of the preferred embodiment of the combination lawn feeder and sprinkler device constructed in accordance with the principles of the present invention.

With reference now to the drawings, and in particular to FIG. 1 thereof, the preferred embodiment of the new and improved combination lawn feeder and sprinkler device embodying the principles and concepts of the present invention and generally designated by the reference numeral 10 will be described.

The present invention, the combination lawn feeder and sprinkler device 10, is comprised of a plurality of components. Such components in their broadest context include a fluid container 12, a cover 14, an extension rod 16, a propeller 18, a water control device 20 and a valve system 22. Such components are individually configured and correlated with respect to each other so as to attain the desired objective.

Figure 2:
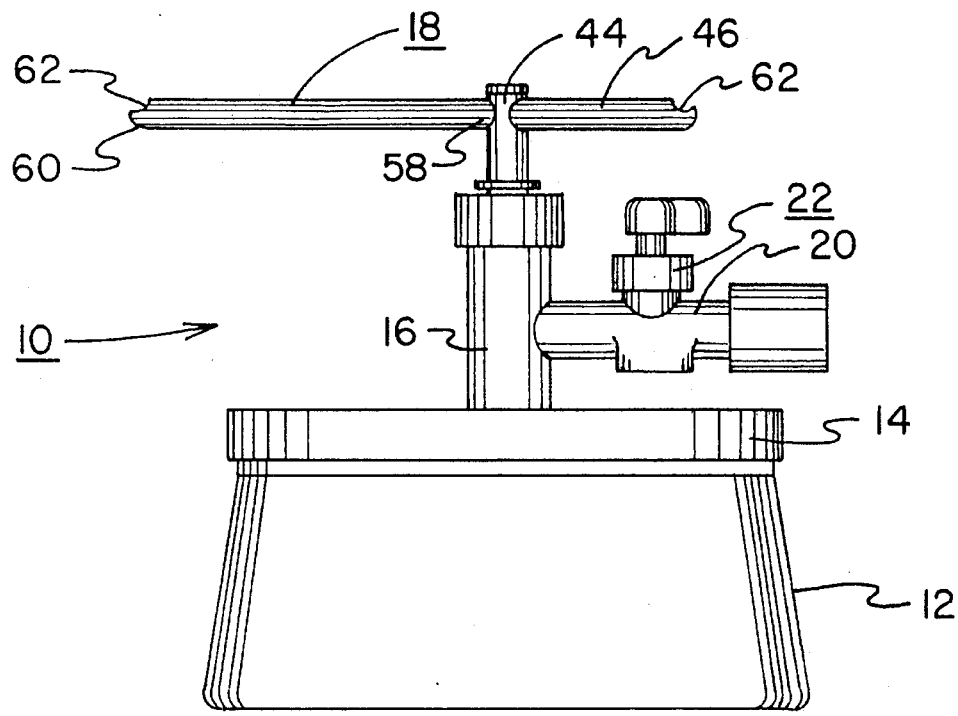
FIG. 2 is a side perspective view of the apparatus shown in FIG. 1.

More specifically, a fluid container 12 is formed in a generally cylindrical configuration with an upper region 26 and a lower region 28. The lower region of the fluid container serves as a base for the apparatus. The upper region has a smaller diameter than the lower region with a gradually increasing diameter therebetween. This configuration helps stabilize the apparatus since the majority of the fluid weight will be concentrated in the lower region of the container. The uppermost extent of the upper region is open and includes a plurality of external screw threads 30 positioned around its periphery. Water soluble fertilizer is placed in the container. The fertilizer dissolves when water is introduced into the apparatus. Note FIGS. 2, 5 and 6.

A cover 14 is formed in a planar generally circular configuration with an upper surface and a lower surface. The periphery of the cover includes a downwardly extending ledge 32 with a plurality of internal screw threads. The center point 34 of the cover has a generally circular shaped aperture extending through it. The cover is screwed on to the upper extent of the container in the operative orientation. The cover is manufactured of sturdy materials to provide strength and stability to the apparatus. The sturdy screw threads prevent the cover from coming loose during use. Note FIG. 6.

An extension rod 16 is positioned vertically and formed in a hollow generally cylindrical configuration with an open upper end 36 and an open lower end 38. The approximate center point of the rod has a radially positioned, generally circular shaped hole 40 extending therein. The upper end of the extension rod includes a plurality of external screw threads 42 around its periphery. The lower end of the extension rod is affixed within the aperture in the cover of the apparatus. The rod is strongly supported by the sturdy cover. In the operative orientation, water is introduced into the container through the hole in the rod. Note FIGS. 4 and 5.

Figure 3:
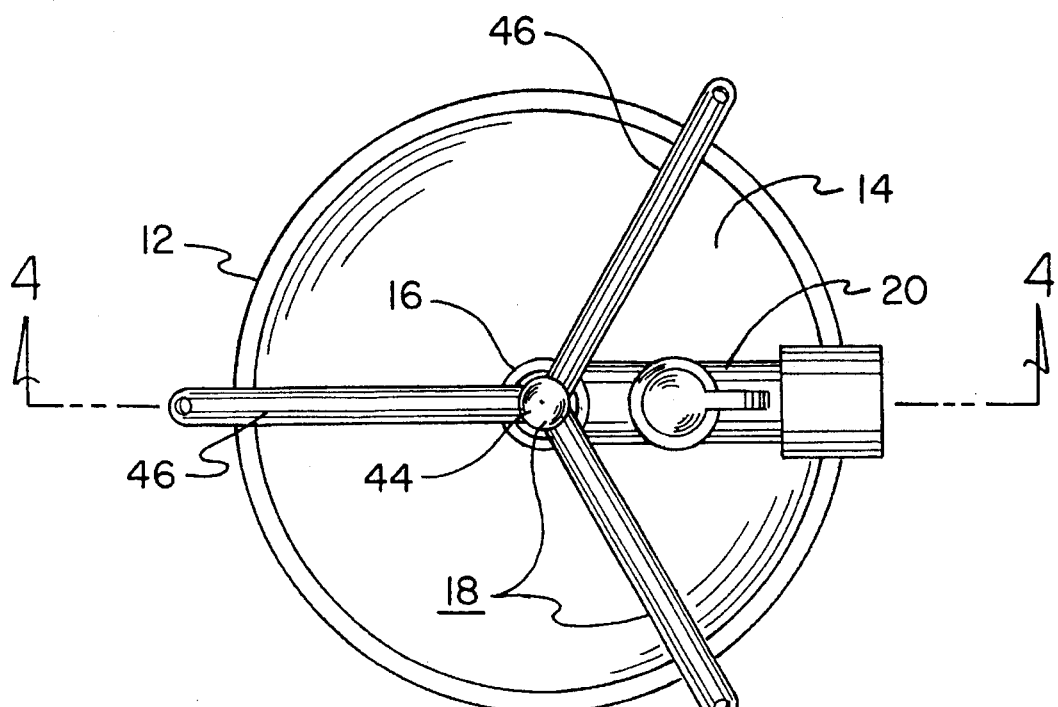
FIG. 3 is a top plan view illustrating the propeller of the apparatus.

A propeller 18 has a central shaft 44 and three horizontally extending blades 46. Note FIGS. 2 and 3. The central shaft is formed in a hollow generally cylindrical configuration with a closed upper extent and an open lower extent. The closed upper extent prevents leakage of fluid therethrough. The central shaft includes a generally cylindrical shaped collar 48 with a plurality of internal screw threads 50. The collar is affixed around the lower extent of the central shaft. The center of the collar permits circular rotation of the shaft therewithin. The collar is screwed onto the upper extent of the extension rod. The collar permits easy disassembly of the apparatus when cleaning is desired. Note FIGS. 4 and 5.

A tube 54 is formed in a hollow generally cylindrical configuration. The tube is positioned within the shaft. The tube extends from the upper extent of the shaft through the extension rod and into the lower portion of the container. The tube is adapted to permit the flow of liquid fertilizer to the upper extent of the shaft. When water is introduced into the apparatus pressure builds up in the container thereby forcing the water and water soluble fertilizer up through the tube and into the blades. Note FIGS. 3, 4 and 5.

The upper extent of the shaft has three radially positioned apertures 56 extending therein. Three blades 46 are formed in a hollow generally cylindrical configuration with an inboard end 58 and an outboard end 60. The inboard end is positioned within the radial apertures of the shaft. The blades are firmly affixed within the shaft to prevent dislodgement during use. The furthest extent of the outboard end of each blade includes an aperture 62 to permit the expulsion of water and liquid fertilizer in the operative orientation. When the water pressure driven fluid travels up through the tube and into the blades, the blades are forced to rotate in a circular orientation. This rotation causes water to be dispersed fairly uniformly over the recipient lawn. Note FIGS. 2, 3, and 4.

A water control device 20 has a hollow interior with an inboard region 66, an outboard region 68 and a central region 70 therebetween. The inboard region is positioned within the hole in the extension rod. The inboard region is firmly affixed therein to prevent dislodgement during use. The outboard region has a larger diameter than the inboard region. The outboard region includes a plurality of internal screw threads 72 and is adapted to be coupled with the male end of a garden hose in the operative orientation. The outboard region securely receives the garden hose to prevent leakage during use. Note FIGS. 3 and 4.

The central region 70 is formed as an enlarged chamber with a valve system 22 positioned within its hollow interior. The central region is formed in a generally cylindrical configuration. The central region projects both above and below the inboard and outboard regions. The upper extent 74 of the central region is open and includes a plurality of external screw threads 76 around its edge. Note FIGS. 4, 5 and 7.

The lower extent 78 of the valve is formed as a planar, generally circular shaped base 78 with an upper surface and a lower surface. The upper surface includes a concave depression 80. A bearing is formed in a generally spherical configuration and is adapted to be positioned within the depression on the upper surface of the base. The depression is contoured to fit the lower extent of the bearing. The bearing has a radial aperture extending through it in a horizontal orientation. The configuration of the bearing permits circular rotation upon its vertical axis to alter the flow of water passing through it. In the operative orientation, water is introduced through the outboard region and flows in an inboard direction. When the aperture in the bearing is positioned in alignment with the interior of the water control device, water is permitted to flow freely therethrough. When the aperture is positioned perpendicular to the interior of the water control device water flow is terminated. Varying degrees of water flow are permitted when the aperture is adjusted between zero and ninety degrees. Note FIG. 7.

The valve system includes a generally L-shaped handle 86. The handle has a horizontal upper portion 88 and a vertical lower portion 90. The upper extent of the lower portion has a smaller diameter than the remainder thereof. This configuration permits releasable coupling of the upper portion of the handle thereto. Note FIG. 7. The lower extent of the vertical portion is affixed to the uppermost extent of the bearing. This configuration permits the user to easily rotate the bearing by turning the handle. Note FIGS. 4, 5 and 7.

The horizontal upper portion of the handle is formed in a planar circular configuration with a planar projection 92 extending from it. The upper portion is shaped to permit easy turning by the user. The upper portion is releasably coupled to the vertical portion. A collar 94 with a plurality of internal screw threads is positioned around the vertical portion of the handle, and is screwed onto the upper extent of the central region. The handle and valve permit the user to control the flow of water through the apparatus in the operative orientation. Note FIGS. 4, 6, and 7.

The combination lawn feeder and sprinkler device is coupled to a garden hose in the operative orientation. The device is adapted to be used with water soluble fertilizers. It consists of a container, a propeller and a water control device. The container is cylindrically shaped and has a broad base. The top edge of the container is threaded. The propeller is coupled to the container top. The propeller has three blades and is attached to the center of the central shaft. The garden hose connector extends from the water control device. The apparatus can be made in a variety of sizes to hold different amounts of fertilizer.

To utilize the apparatus the user simply fills the container with lawn fertilizer and screws on the cover. The user then adjusts the water control device to the on position. The garden hose is then connected to the apparatus and the water is turned on. The water will fill the container. When it does, it will dissolve the fertilizer and the mixture will be dispersed through the sprinkler blades.

Unlike existing devices designed for use with hoses, the combination lawn feeder and sprinkler device does not have to be held while it is being used. It accomplishes two functions simultaneously, watering the lawn and applying fertilizer.

The operating instructions are as follows. Step one: Put the desired amount of lawn food into the container. Step two: Attach a garden hose to the water control device. Make sure the valve is in the open position. Turn the water faucet on, allowing water to flow through the control device. The water will simultaneously fill up the ground base and cause rotation of the blades of the propeller. Once the container is filled up, the pressure will push the water, and lawn food through the apparatus causing the propeller to water and feed the lawn. Physically holding the apparatus is unnecessary. The apparatus is adapted to work on water pressure alone.

As to be the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved combination lawn feeder and sprinkler device comprising, in combination:

a fluid container formed in a cylindrical configuration with an open top, an upper extent, and a lower region serving as a base for the device, the upper extent of the container having a smaller diameter then the lower extent with a gradually increasing diameter therebetween, the upper extent including external screw threads, in an operative orientation the fluid container including water soluble fertilizer and water, the configuration of the container serving to stabilize the apparatus since the majority of the fluid weight will be concentrated in the lower region of the container;

a cover formed in a planar circular configuration with an upper surface and a lower surface, the cover including a downwardly extending ledge with internal screw threads, the cover being coupled to the upper extent of the container, the center point of the cover having a circular aperture extending therethrough;

an extension rod formed in a hollow cylindrical configuration with two open ends, the approximate center point of the rod having a radially positioned circular aperture, the uppermost end of the extension rod including a plurality of external screw threads, the lower extent of the extension rod being positioned in the aperture in the cover;

a propeller having a central shaft and three horizontally extending blades, the shaft being formed in a hollow cylindrical configuration with a closed upper extent and an open lower extent, a cylindrical collar with a plurality of internal screw threads, the collar being coupled to the upper extent of the extension rod, a tube formed in a hollow cylindrical configuration, the tube positioned within the extension rod and extending into the container, the upper extent of the shaft having three radially positioned apertures, the three blades being formed in a hollow cylindrical configuration with an inboard end and an outboard end, each inboard end being positioned within the apertures of the shaft, each outboard end including an aperture to permit the expulsion of fluid, the three rotating blades serving to distribute fluid uniformly over a recipient lawn;

a water control device having a hollow interior with an inboard region, an outboard region and a central region therebetween, the inboard region being positioned within the hole in the extension rod, the outboard region having a larger diameter than the inboard region and including coupling means; and the central region being formed as an enlarged chamber and including an upper extent including a plurality of external screw threads, a valve system being positioned therein, the lower extent of the valve system being formed as a planar circular base, the lower extent including a concave depression, a bearing formed in a generally spherical configuration being positioned in the depression of the lower extent, the depression being contoured to fit the lower extent of the bearing, the bearing having a horizontally positioned radial aperture extending therethrough, the bearing permitting circular rotation upon its vertical axis to alter the flow of water therethrough, the valve system including a generally L-shaped handle with a horizontal upper portion and a vertical lower portion, the lower extent of the vertical portion being affixed to the uppermost extent of the bearing, the horizontal portion being formed in a planar circular configuration with a projection extending therefrom, the horizontal portion being releasably coupled to the vertical portion, a handle collar with coupling means being positioned around the vertical portion of the handle and coupled to the upper extent of the chamber, the handle collar permitting easy disassembly of the valve system, the valve system permitting the user to control the flow of water through the apparatus in the operative orientation.

* * * * *